(12) United States Patent
Ogiwara et al.

(10) Patent No.: US 10,781,977 B2
(45) Date of Patent: Sep. 22, 2020

(54) HIGH PRESSURE TANK

(71) Applicant: HONDA MOTOR CO., LTD., Minato-ku, Tokyo (JP)

(72) Inventors: Naoki Ogiwara, Wako (JP); Satoru Kawase, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 239 days.

(21) Appl. No.: 15/920,582

(22) Filed: Mar. 14, 2018

(65) Prior Publication Data

US 2018/0266632 A1 Sep. 20, 2018

(30) Foreign Application Priority Data

Mar. 17, 2017 (JP) .................. 2017-053086

(51) Int. Cl.
*F17C 13/02* (2006.01)
*F17C 13/12* (2006.01)
(Continued)

(52) U.S. Cl.
CPC ............... *F17C 13/06* (2013.01); *F17C 1/02* (2013.01); *F17C 1/06* (2013.01); *F17C 13/02* (2013.01); *F17C 13/123* (2013.01); *F17C 2201/0109* (2013.01); *F17C 2201/056* (2013.01); *F17C 2203/012* (2013.01); *F17C 2203/0604* (2013.01); *F17C 2203/066* (2013.01); *F17C 2203/0619* (2013.01); *F17C 2203/0621* (2013.01); *F17C 2203/0658* (2013.01);
(Continued)

(58) Field of Classification Search
CPC .......... F17C 13/06; F17C 13/04; F17C 13/123
See application file for complete search history.

(56) References Cited

U.S. PATENT DOCUMENTS 3,323,541 A * 6/1967 Schneider, Jr. ....... F17C 13/123
137/312
4,834,137 A 5/1989 Kawaguchi et al.
(Continued)

FOREIGN PATENT DOCUMENTS

JP 64-06990 3/1989
JP 64-069900 3/1989
(Continued)

OTHER PUBLICATIONS

Chinese Office Action and Search Report for Chinese Patent Application No. 201810219788.3 dated Oct. 12, 2019.
(Continued)

*Primary Examiner* — Andrew T Kirsch
(74) *Attorney, Agent, or Firm* — Amin, Turocy & Watson, LLP

(57) ABSTRACT

A high pressure tank includes: a resin liner for containing a fluid; a reinforced layer covering an outer surface of the liner; a cap including a supply/discharge hole to supply and discharge the fluid to and from the liner; an isolation wall member; and a communication unit. The cap includes a cylindrical protrusion having the supply/discharge hole formed therein. An opening is formed in the reinforced layer to expose the protrusion. The isolation wall member encloses the protrusion and the opening, and forms a closed space. The communication unit communicates with the closed space.

3 Claims, 3 Drawing Sheets

(51) Int. Cl.
*F17C 13/06* (2006.01)
*F17C 1/02* (2006.01)
*F17C 1/06* (2006.01)

(52) U.S. Cl.
CPC .......... *F17C 2203/0663* (2013.01); *F17C 2205/0192* (2013.01); *F17C 2205/0305* (2013.01); *F17C 2209/234* (2013.01); *F17C 2221/012* (2013.01); *F17C 2223/0123* (2013.01); *F17C 2223/036* (2013.01); *F17C 2250/0443* (2013.01); *F17C 2250/0491* (2013.01); *F17C 2250/0636* (2013.01); *F17C 2260/037* (2013.01); *F17C 2260/038* (2013.01); *F17C 2260/042* (2013.01); *F17C 2270/0168* (2013.01); *F17C 2270/0184* (2013.01); *Y02E 60/321* (2013.01)

(56) References Cited

U.S. PATENT DOCUMENTS

| | | | | |
|---|---|---|---|---|
| 5,476,189 | A | * | 12/1995 | Duvall .............. F17C 1/16 220/588 |
| 5,701,928 | A | | 12/1997 | Aoki |
| 10,415,753 | B2 | | 9/2019 | Uehara et al. |

FOREIGN PATENT DOCUMENTS

| | | |
|---|---|---|
| JP | 08-099544 | 4/1996 |
| JP | 2009-108971 | 5/2009 |
| JP | 2009-243660 | 10/2009 |
| JP | 2015-155736 | 8/2015 |
| JP | 2016-211675 | 12/2016 |
| WO | 2016/189664 | 12/2016 |

OTHER PUBLICATIONS

Japanese Office Action for Japanese Patent Application No. 2017-053086 dated Dec. 18, 2018.

* cited by examiner

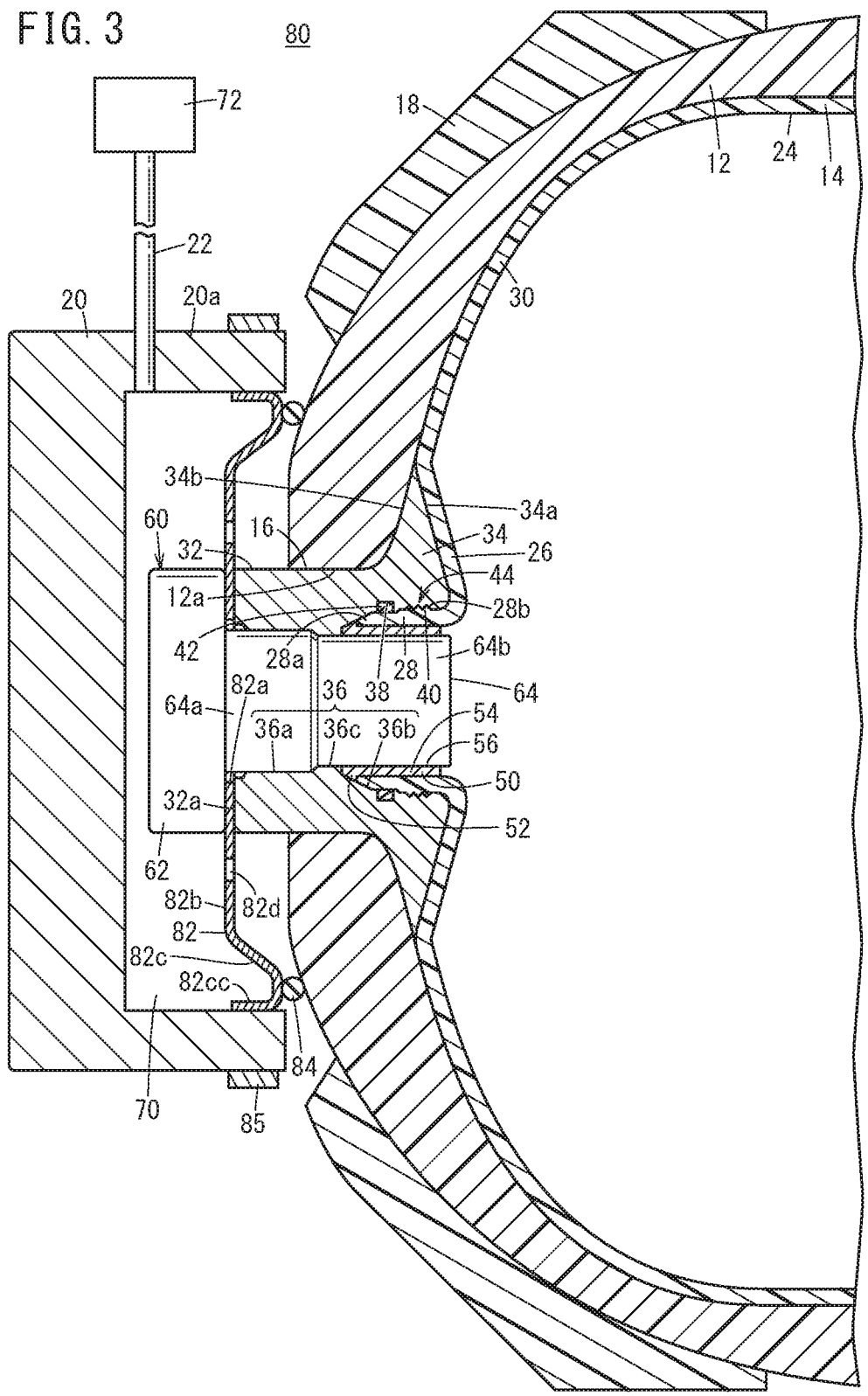

HIGH PRESSURE TANK

CROSS-REFERENCE TO RELATED APPLICATION

This application is based upon and claims the benefit of priority from Japanese Patent Application No. 2017-053086 filed on Mar. 17, 2017, the contents of which are incorporated herein by reference.

BACKGROUND OF THE INVENTION

Field of the Invention

The present invention relates to a high pressure tank that includes a liner that can contain a fluid inside and is made of resin, a reinforced layer that covers an outer surface of the liner, and a cap that includes a supply/discharge hole that is formed to supply and discharge the fluid to and from an interior of the liner.

Description of the Related Art

High pressure tanks are widely used as containers that contain fluids such as gases and liquids. For example, a high pressure tank is mounted on a fuel cell vehicle as a container for a hydrogen gas to be supplied to a fuel cell system.

A high pressure tank of this type is known to include liner that can contain a fluid inside and is made of resin, a reinforced layer that covers an outer surface of the liner and is made of fiber-reinforced plastics, and a cap that includes a supply/discharge hole that is formed therein to supply and discharge a fluid to and from an interior of the liner. For example, a fixing member such as a valve is fixed to this supply/discharge hole. Via the fixing member, the fluid can be supplied to the interior of the liner, and the fluid contained inside the liner can be discharged.

In such a high pressure tank, the fluid having permeated the resin liner enters a gap between the outer surface of the liner and the reinforced layer, and moves toward the cap. Since a connection portion between the cap and the liner is positioned inside the supply/discharge hole, the fluid may leak out of a gap between an inner circumferential surface of the supply/discharge hole and the fixing member.

For example, Japanese Laid-Open Patent Publication No. 2015-155736 proposes a configuration to guide a fluid having entered the gap between an outer surface of a liner and a cap and the gap between an inner circumferential surface of a supply/discharge hole and a fixing member, to an outside of a high pressure tank and collect it in a collection container. More specifically, the cap is provided with a cap side vent hole formed of a through-hole and a branch hole. The through-hole penetrates near the supply/discharge hole along its axial direction such that an opening at one end faces toward the outer surface of the liner and another opening at the other end faces toward an outside of the high pressure tank. The branch hole is branched from the through-hole to communicate between the inner circumferential surface of the supply/discharge hole and the fixing member. The other end of the through-hole communicates with the collection container via a vent hole formed in the fixing member. That is, the fluid having entered the gap between the outer surface of the liner and the cap is guided to the collection container via the through-hole. The fluid having entered between the inner circumferential surface of the supply/discharge hole and the fixing member is guided to the collection container via the branch hole and the through-hole.

SUMMARY OF THE INVENTION

By the way, a fluid permeates through the liner, enters the gap between the liner and the reinforced layer, and moves not only toward the gap between the cap and the outer surface of the liner, but also toward the gap between the cap and the reinforced layer. However, the configuration where the cap side vent hole is formed in the cap as described above can collect only the fluid having entered the gap between the outer surface of the liner and the cap, and the fluid having entered the gap between the inner circumferential surface of the supply-discharge hole and the fixing member.

Therefore, it has been difficult to collect the fluid that enters the gap between the cap and the reinforced layer and leaks through an opening that is formed in the reinforced layer to expose the cap.

A main object of the present invention is to provide a high pressure tank that can effectively prevent leakage of a fluid.

One embodiment of the present invention provides a high pressure tank that includes: a resin liner configured to contain a fluid; a reinforced layer covering an outer surface of the liner; and a cap including a supply/discharge hole configured to supply and discharge the fluid to and from the liner, wherein: the cap includes a cylindrical protrusion having the supply/discharge hole formed therein; an opening is formed in the reinforced layer to expose the protrusion; and the high pressure tank further includes: an isolation wall member configured to enclose the protrusion and the opening of the reinforced layer inside, and form a closed space; and a communication unit communicating with the closed space.

In this high pressure tank, the isolation wall member can form the closed space that accommodates the opening of the reinforced layer and the protrusion. That is, when the fluid having permeated the liner enters the gap between the cap and the reinforced layer, the fluid can be collected in the closed space via the opening of the reinforced layer. On the other hand, when the fluid having permeated the liner enters the gap between the cap and the outer surface of the liner, the fluid can be collected in the closed space via the supply/discharge hole. Further, when the fluid inside the liner enters the gap between the fixing member arranged in the supply/discharge hole and the inner circumferential surface of the supply/discharge hole, the fluid can be collected in the closed space via the supply/discharge hole. Further, as described above, the fluid collected in the closed space can be guided to the outside of the high pressure tank via the communication unit.

As described above, this high pressure tank can effectively suppress leakage of the fluid.

In the high pressure tank, the communication unit may be connected to a detecting unit configured to detect the fluid. In this case, for example, the amount of the fluid in the closed space, i.e., the amount of the fluid leaking from a fluid containing portion inside the reinforced layer, the liner, the cap and the fixing member into the external closed space can be detected. Consequently, it is possible to quickly detect an abnormality of the high pressure tank. In the high pressure tank, the communication unit may be connected to the external space to which the fluid is discharged. In this case, the fluid collected in the closed space can be easily treated. The fluid may be diluted, if necessary, before being discharged to the external space. The high pressure tank may further include a protection member covering a dome-shaped portion of the liner with the reinforced layer interposed therebetween, while exposing the protrusion. The dome-shaped portion curves in a dome shape. The isolation wall member may be attached to an attachment portion integrally formed with the protection member. In this case, a simple configuration where the attachment portion is provided to the protection member and the isolation wall member is attached to the attachment member can form the closed space.

The high pressure tank may further include: a fixing member including a head portion and an insertion portion extending from the head portion, the insertion portion being inserted into the supply/discharge hole, and the head portion being fixed to the protrusion in a state where the head portion faces toward a distal end surface of the protrusion; a plate member interposed between the distal end surface of the protrusion and the head portion and including a through-hole and a passage hole formed therein, the through-hole being configured to allow insertion of the insertion portion and the passage hole being configured to allow the fluid to flow, the plate member extending radially outward of the through-hole covering the distal end surface of the protrusion and the opening of the reinforced layer; and a seal member interposed between the plate member and the reinforced layer, an end portion of the isolation wall member is attached to the plate member, and the head portion and the distal end surface are brought close to each other to fix the fixing member to the protrusion, so that the plate member pressed by the head portion presses the seal member to cause compression deformation of the seal member.

In this case, by fixing the fixing member to the protrusion, the plate member can be also fixed to the protrusion. Moreover, the seal member can be compressed and deformed between the plate member and the outer surface of the reinforced layer to enhance sealability. That is, it is possible to prevent the fluid from passing between the plate member and the outer surface of the reinforced layer, and consequently more effectively prevent leakage of the fluid.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a schematic cross-sectional view of main portion of the high pressure tank according to a second embodiment of the present invention.

DESCRIPTION OF THE PREFERRED EMBODIMENTS

A preferred embodiment of a high pressure tank according to the present invention will be described in detail below with reference to the accompanying drawings.

The high pressure tank according to the present invention is mounted on, for example, a fuel cell vehicle, and is suitably used to contain a hydrogen gas to be supplied to a fuel cell system. The present embodiment will describe an example where the high pressure tank contains a hydrogen gas as a fluid to be supplied to the fuel cell system, yet is not limited to this in particular. The high pressure tank according to the present invention can contain a fluid other than the hydrogen gas.

Figure 1:
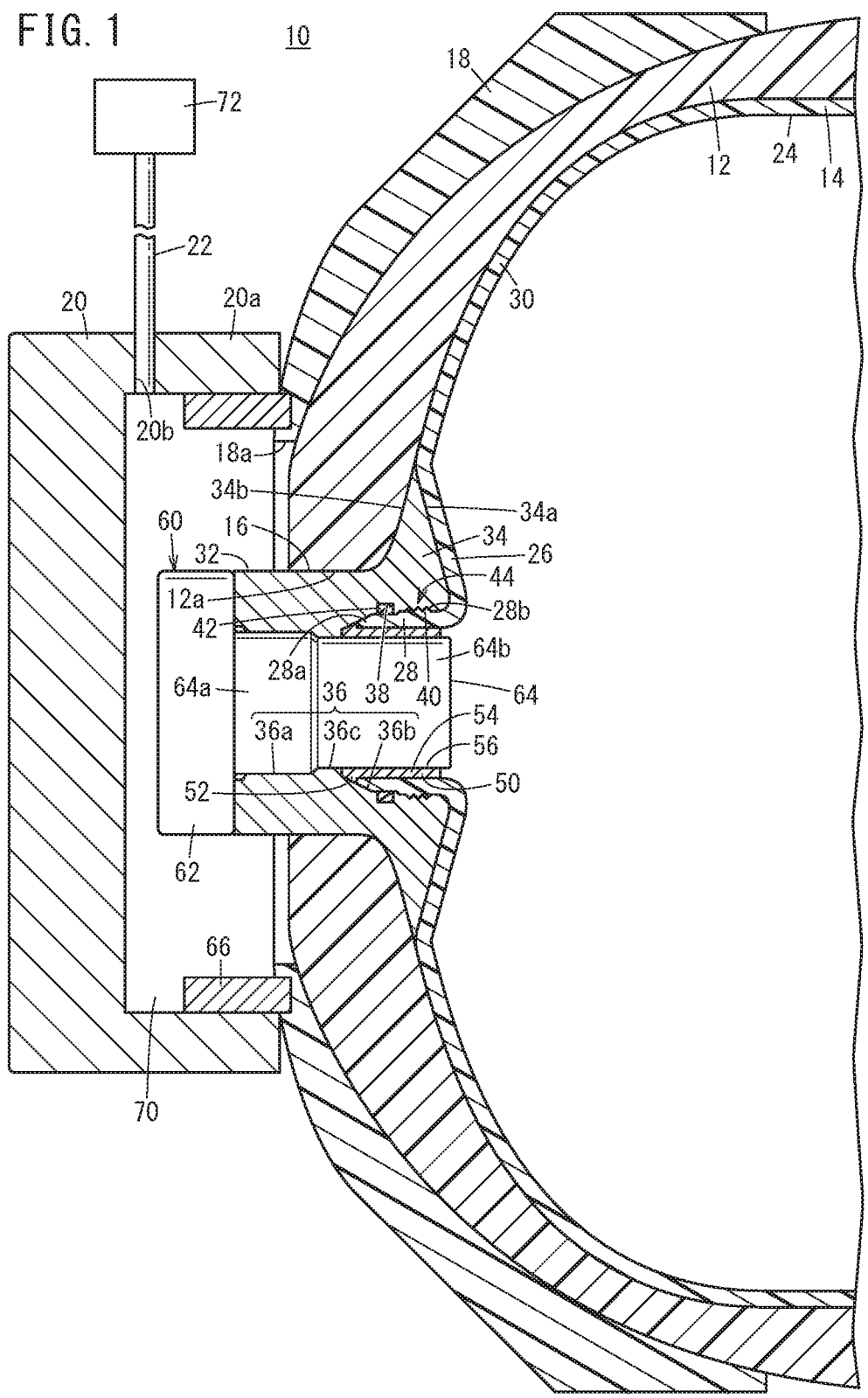
FIG. 1 is a schematic cross-sectional view of a main portion of a high pressure tank according to a first embodiment of the present invention.

As shown in FIG. 1, a high pressure tank 10 according to the first embodiment of the present invention mainly includes a reinforced layer 12, a liner 14, a cap 16, a protection member 18, an isolation wall member 20 and a communication unit 22. The reinforced layer 12 is made of carbon fiber reinforced plastics (CFRP), and covers an outer surface and the like of the liner 14.

The liner 14 is a hollow body made of resin, and can contain a hydrogen gas inside. More specifically, the liner 14 includes a main body portion 24 having an outer surface covered by the reinforced layer 12, a dented portion 26 that is bent inward of the main body portion 24, a cylindrical portion 28 that protrudes outward of the main body portion 24 from the dented portion 26, and a dome-shaped portion 30 that extends opposite the cylindrical portion 28 from the dented portion 26, and curves in a dome shape.

A thin portion 28a thinner than other portions is formed on a protrusion end (distal end) side of the cylindrical portion 28. A male screw 28b is formed on a side closer to a proximal end than the thin portion 28a of the cylindrical portion 28. The cap 16 is fitted onto the cylindrical portion 28.

The cap 16 is made of metal, for example, and has a protrusion 32 of a cylindrical shape and a shoulder portion 34 that extends radially outward from the proximal end of the protrusion 32. A supply/discharge hole 36 is formed, penetrating along an axial direction of the protrusion 32.

An end surface 34a of the shoulder portion 34 on a side opposite to the protrusion 32 is brought into contact with an outer surface of the dented portion 26 of the liner 14. An outer surface 34b of the shoulder portion 34 on a side of the protrusion 32 is covered by the reinforced layer 12 together with the liner 14. That is, the cap 16 has a shape that the shoulder portion 34 is covered together with the liner 14 by the reinforced layer 12 and the protrusion 32 is exposed and protrudes through an opening 12a of the reinforced layer 12. In the present embodiment, the proximal end side of the protrusion 32 is partially covered by the reinforced layer 12 by the amount corresponding to the thickness of the reinforced layer 12.

An outer diameter of the protrusion 32 is substantially constant. On the other hand, an inner diameter of the protrusion 32, i.e., a diameter of the supply/discharge hole 36 differs per portion. More specifically, the supply/discharge hole 36 includes a middle diameter hole 36a located on the side of the protrusion 32 in the axial direction, a large diameter hole 36b located on a side of the shoulder portion 34, and a small diameter hole 36c formed between the middle diameter hole 36a and the large diameter hole 36b.

The cylindrical portion 28 is inserted in the large diameter hole 36b. Thus, an outer circumferential surface of the cylindrical portion 28 is disposed along a surface of the large diameter hole 36b. That is, an inner diameter of the large diameter hole 36b is set to a size matching an outer diameter of the cylindrical portion 28. More specifically, an inner diameter of a portion of the large diameter hole 36b facing toward the thin portion 28a is smaller than an inner diameter of a portion on a side closer to the proximal end than the thin portion 28a. An inner wall of the large diameter hole 36b includes, at a portion facing toward the thin portion 28a of the cylindrical portion 28, a seal groove 38 of an annular shape along a circumferential direction of the large diameter hole 36b, and at a portion facing toward the male screw 28b of the cylindrical portion 28, a female screw 40 to be screwed with the male screw 28b.

A seal member 42 is disposed inside the seal groove 38, and is formed by an O ring. A distance (seal gap) between an inner wall surface of the seal groove 38 and the outer circumferential surface of the thin portion 28a is set to maintain a compressed state of the seal member 42 therebetween. Thus, the outer circumferential surface of the cylindrical portion 28 and the inner circumferential surface of the supply/discharge hole 36 of the cap 16 are sealed.

On a side closer to the proximal end of the cylindrical portion 28 than the seal groove 38, the male screw 28b and the female screw 40 are screwed to form a bonding portion 44 that bonds the outer circumferential surface of the cylindrical portion 28 and the inner circumferential surface of the large diameter hole 36b.

A collar 50 is further disposed inside the large diameter hole 36b to support the cylindrical portion 28. The collar 50 is made of metal, for example, and includes a collar head portion 52 of an annular shape and a cylinder portion 54 of a cylindrical shape integrally formed with the collar head portion 52. A passage hole 56 is formed, penetrating the collar 50 along the axial direction of the cylinder portion 54. The diameter of the passage hole 56 is substantially equal to the diameter of the small diameter hole 36c of the supply/discharge hole 36.

In the large diameter hole 36b, one end surface of the collar head portion 52 comes into contact with a step surface formed between the small diameter hole 36c and the large diameter hole 36b, and the other end surface of the collar head portion 52 comes into contact with a distal end surface of the cylindrical portion 28. The cylinder portion 54 is inserted on an inner side of the cylindrical portion 28, so that the passage hole 56 communicates with the middle diameter hole 36a and the small diameter hole 36c of the supply/discharge hole 36 and the interior of the liner 14. An outer circumferential surface of the cylinder portion 54 extends along the surface of the large diameter hole 36b with the cylindrical portion 28 interposed therebetween. That is, the cylindrical portion 28 is sandwiched between the outer circumferential surface of the cylinder portion 54 and the surface of the large diameter hole 36b.

From a viewpoint to sandwich the cylindrical portion 28 more suitably, the cylinder portion 54 is preferably press-fitted in the cylindrical portion 28. In this case, the cylinder portion 54 presses the cylindrical portion 28 toward the surface of the large diameter hole 36b. Then, the outer circumferential surface of the cylindrical portion 28 comes into pressing contact with the surface of the large diameter hole 36b. Consequently, it is easy to keep the seal gap constant.

A fixing member 60 is fixed to the supply/discharge hole 36. The fixing member 60 is formed of, for example, a solenoid valve. The hydrogen gas is supplied to and discharged from the liner 14 via the fixing member 60. That is, for example, a hydrogen gas supply pipe connected to a hydrogen supply source, and a hydrogen gas discharge pipe connected to the fuel cell system (none of which is shown) are inserted through the fixing member 60.

The fixing member 60 includes a head portion 62 and an insertion portion 64. The head portion 62 has, for example, a columnar shape whose diameter is substantially equal to the outer diameter of the protrusion 32. The insertion portion 64 has a columnar shape that protrudes from a substantial center of one end surface of the head portion 62 and is inserted into the supply/discharge hole 36. The insertion portion 64 includes a large diameter portion 64a on a proximal end side, and a small diameter portion 64b on a distal end side. The large diameter portion 64a is inserted in the middle diameter hole 36a such that a circumferential surface of the large diameter portion 64a is in contact with a surface of the middle diameter hole 36a. The small diameter portion 64b is inserted in the small diameter hole 36c and the passage hole 56 such that a circumferential surface of the small diameter portion 64b is in contact with surfaces of the small diameter hole 36c and the passage hole 56.

The protection member 18 is made of, for example, resin, includes an opening 18a through which the protrusion 32 is exposed, and extends radially outward of the opening 18a to cover the dome-shaped portion 30 of the liner 14 with the reinforced layer 12 interposed therebetween. By arranging the protection member 18 in this way, it is possible to improve impact resistance of the high pressure tank 10.

An attachment portion 66 of a cylindrical shape made of metal, for example, is formed integrally with a periphery portion of the opening 18a of the protection member 18, and protrudes along the axial direction of the protrusion 32. The protection member 18 provided with the attachment portion 66 in this way can be easily formed by insert molding.

The isolation wall member 20 forms a closed space 70 that accommodates the opening 12a of the reinforced layer 12 and the protrusion 32 of the cap 16. In the present embodiment, the isolation wall member 20 has a bottomed cylindrical shape with an open end portion 20a, and can form the closed space 70 by attaching the end portion 20a to the attachment portion 66. Considering an easy maintenance operation, the isolation wall member 20 may be detachably attached to the attachment portion 66. An insertion hole through which the hydrogen gas supply pipe and the hydrogen gas discharge pipe are inserted (not shown) is formed in the isolation wall member 20 to flow the hydrogen gas to the liner 14 via the closed space 70 and the fixing member 60. For example, seal members (not shown) are provided to keep airtightness between the insertion hole and each of the hydrogen gas supply pipe and the hydrogen gas discharge pipe.

The communication unit 22 is formed as, for example, a communication pipe that communicates with the closed space 70 via a through-hole 20b formed in the isolation wall member 20. In the present embodiment, the communication unit 22 is connected to a detecting unit 72 that can detect a flow rate of the hydrogen gas. This detecting unit 72 is preferably disposed closer to an upper side in a vertical direction than the closed space 70 when the high pressure tank 10 is mounted on the fuel cell vehicle (not shown). Thus, the hydrogen gas having a lower density than air can be guided suitably to the detecting unit 72 via the communication unit 22. Consequently, it is possible to improve detection accuracy of the detecting unit 72. The communication unit 22 may be connected to a space outside the fuel cell vehicle instead of the detecting unit 72. In this case, the hydrogen gas may be diluted, if necessary, before being discharged to the outside.

The high pressure tank 10 according to the first embodiment is basically configured as described above. As described above, in this high pressure tank 10, the hydrogen gas is supplied from the hydrogen supply source (not shown) into the liner 14 via the hydrogen gas supply pipe and the fixing member 60. When the hydrogen gas having been supplied in this way highly pressurizes the interior of the liner 14, the hydrogen gas easily permeates the liner 14 and enters a gap between the outer surface of the liner 14 and the reinforced layer 12, compared to the case in a low pressure state of the interior.

Figure 2:
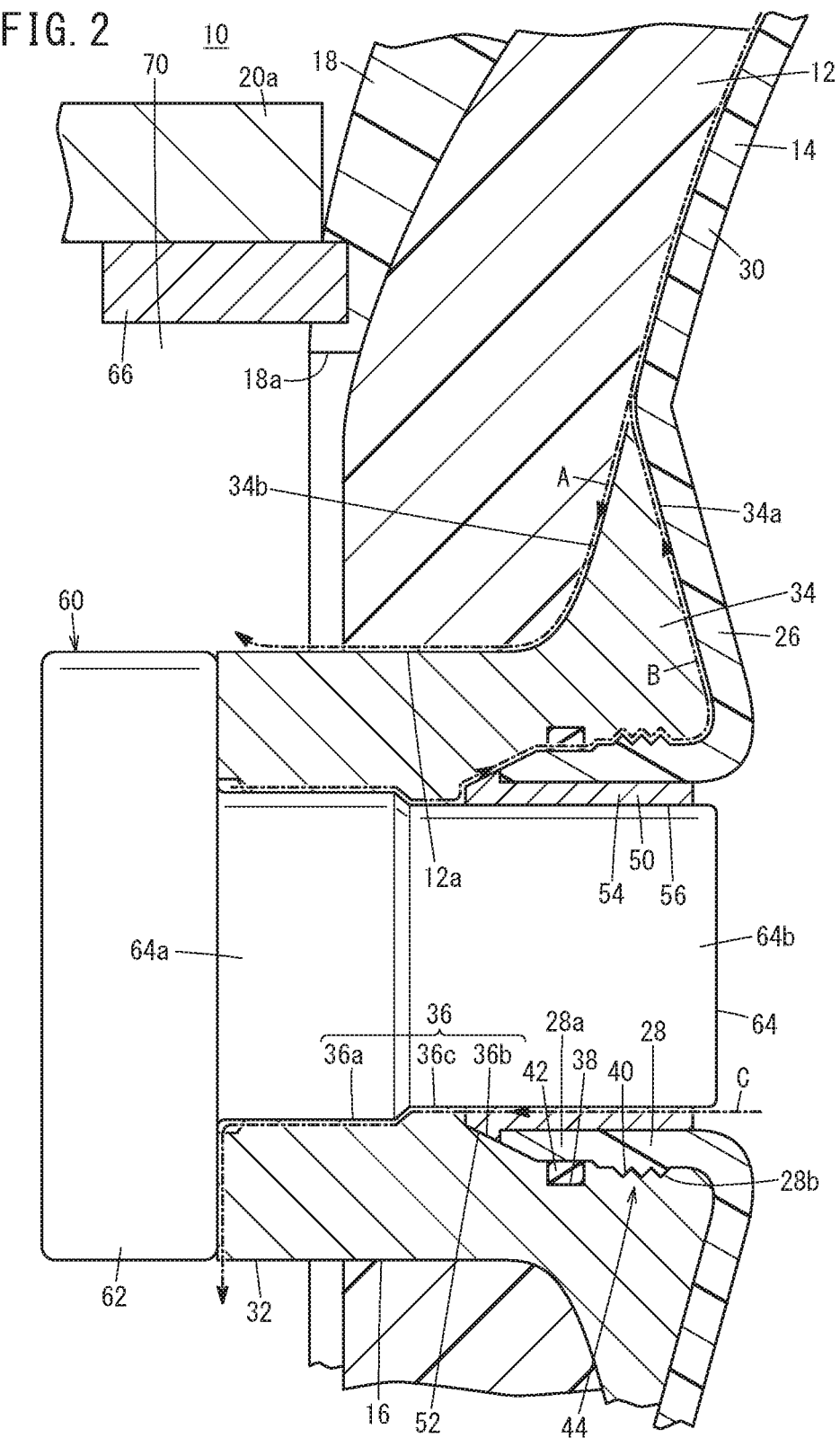
FIG. 2 is a partially enlarged view of FIG. 1.

As described above, the isolation wall member 20 forms the closed space 70 that accommodates the opening 12a of the reinforced layer 12 and the protrusion 32. Hence, in a case where the hydrogen gas having permeated the liner 14 enters the gap between the outer surface 34b of the shoulder portion 34 of the cap 16 and the reinforced layer 12 in a direction as indicated by an arrow A in FIG. 2, the hydrogen gas can be collected in the closed space 70 via the opening 12a of the reinforced layer 12. On the other hand, in a case where the hydrogen gas having permeated the liner 14 enters the gap between the cap 16 and the outer surface of the liner 14 in a direction as indicated by an arrow B in FIG. 2, the hydrogen gas can be collected in the closed space 70 via the opening 12a of the reinforced layer 12. When the hydrogen gas inside the liner 14 enters the gap between the fixing member 60 arranged in the supply/discharge hole 36 and the inner circumferential surface of the supply/discharge hole 36 in a direction as indicated by an arrow C in FIG. 2, the hydrogen gas can be collected in the closed space 70 via the supply/discharge hole 36. As described above, the hydrogen gas collected in the closed space 70 can be guided to the outside of the high pressure tank 10 via the communication unit 22.

As described above, even when the hydrogen gas leaks from the fluid containing portion inside the reinforced layer 12, the liner 14, the cap 16 and the fixing member 60, this high pressure tank 10 can collect the hydrogen gas in the closed space 70 formed inside the isolation wall member 20. Consequently, it is possible to effectively prevent leakage of the hydrogen gas to the outside of the high pressure tank 10.

In this high pressure tank 10, the communication unit 22 can be connected to the detecting unit 72 as described above. Thus, it is possible to detect the amount of the hydrogen gas in the closed space 70, i.e., the amount of the hydrogen gas leaked out from the fluid containing portion to the closed space 70. Therefore, it is possible to quickly detect the abnormality of the high pressure tank 10. On the other hand, when the communication unit 22 is connected to the external space, the hydrogen gas collected in the closed space 70 can be easily treated.

With a simple configuration of this high pressure tank 10 where the protection member 18 is provided with the attachment portion 66 to which the isolation wall member 20 is attached, the closed space 70 can be established.

Next, a high pressure tank 80 according to a second embodiment of the present invention will be described with reference to FIG. 3. In this regard, components shown in FIG. 3 and having the same or similar functions and effects as those of the components shown in FIG. 1 will be assigned with the same reference numerals, and will not be described in detail.

The high pressure tank 80 employs the same configuration as that of the high pressure tank 10 except that the isolation wall member 20 is attached to a plate member 82 instead of the attachment portion 66 (see FIG. 1) integrally formed with the protection member 18. That is, the high pressure tank 80 includes the plate member 82, a seal member 84 and a band member 85 instead of the attachment portion 66.

The plate member 82 is, for example, made of metal, resin, or the like, and has a disk shape with a through-hole 82a through which the insertion portion 64 of the fixing member 60 are inserted is formed. The plate member 82 extends radially outward of the through-hole 82a to cover the distal end surface 32a of the protrusion 32 and the opening 12a of the reinforced layer 12. More specifically, the plate member 82 includes a flat portion 82b that extends along the distal end surface 32a radially outward of the through-hole 82a. This flat portion 82b is provided with an extended portion 82c that inclines from an outer periphery portion of the flat portion 82b to approach the outer surface of the reinforced layer 12, and then further extends flatly in a direction parallel to the flat portion 82b. A bent portion 82cc is formed further radially outward of the extended portion 82c to extend inside of the isolation wall member 20 along an inner wall surface of the end portion 20a of the isolation wall member 20.

A plurality of passage holes 82d are formed in the flat portion 82b around the through-hole 82a, to allow the hydrogen gas to flow.

The seal member 84 is interposed between the flat portion of the extended portion 82c and the reinforced layer 12. The band member 85 is arranged on an outer circumference of the end portion 20a of the isolation wall member 20. Thus, the band member 85 and the bent portion 82cc sandwich the end portion 20a. Consequently, the plate member 82 and the isolation wall member 20 can be fixed suitably.

The insertion portion 64 of the fixing member 60 inserted in the through-hole 82a of the plate member 82 is inserted into the supply/discharge hole 36 to sandwich the flat portion 82b between the head portion 62 of the fixing member 60 and the distal end surface 32a of the protrusion 32. Consequently, the plate member 82 can be easily fixed to the protrusion 32. In this case, the flat portion of the extended portion 82c is brought close to the reinforced layer 12, so that it is possible to press the seal member 84 interposed between the extended portion 82c and the reinforced layer 12 to cause compression deformation of the seal member 84. Consequently, it is possible to more suitably seal the plate member 82 and the outer surface of the reinforced layer 12.

That is, in this high pressure tank 80, the closed space 70 that accommodates the protrusion 32 and the opening 12a is formed between the isolation wall member 20 and the reinforced layer 12 with the seal member 84 and the plate member 82 interposed therebetween. In this closed space 70, a side on the reinforced layer 12 and a side on the isolation wall member 20 of the plate member 82 communicate via the passage holes 82d.

Consequently, this high pressure tank 80 can also collect the hydrogen gas in the closed space 70 formed inside the isolation wall member 20, even when the hydrogen gas leaks out of the fluid containing portion, the collected hydrogen gas can be guided to the outside of the high pressure tank 80 via the communication unit 22. Consequently, it is possible to effectively prevent unintentional leakage of the hydrogen gas to the outside of the high pressure tank 80. As described above, since it is possible to more easily and suitably seal the gap between the plate member 82 and the outer surface of the reinforced layer 12, the leakage of the hydrogen gas can more effectively be prevented.

The present invention is not limited to the embodiments in particular, and can be variously modified without departing from the scope of the invention.

What is claimed is:

1. A high pressure tank comprising:
   a resin liner configured to contain a fluid;
   a reinforced layer covering an outer surface of the liner; and
   a cap including a supply/discharge hole configured to supply and discharge the fluid to and from the liner, wherein:

the cap includes a cylindrical protrusion having the supply/discharge hole formed therein;
an opening is formed in the reinforced layer to expose the protrusion; and
the high pressure tank further comprises:
an isolation wall member configured to enclose the protrusion and the opening of the reinforced layer inside, and form a closed space;
a communication unit communicating with the closed space;
a fixing member including a head portion and an insertion portion extending from the head portion, the insertion portion being inserted into the supply/discharge hole, and the head portion being fixed to the protrusion in a state where the head portion faces toward a distal end surface of the protrusion;
a plate member interposed between the distal end surface of the protrusion and the head portion, the plate member including a through-hole and a passage hole formed therein, the through-hole being configured to allow insertion of the insertion portion and the passage hole being configured to allow the fluid to flow, the plate member extending radially outward of the through-hole to cover the distal end surface of the protrusion and the opening of the reinforced layer; and
a seal member interposed between the plate member and the reinforced layer, wherein:
an end portion of the isolation wall member is attached to the plate member, and
the head portion and the distal end surface are brought close to each other to fix the fixing member to the protrusion, so that the plate member pressed by the head portion presses the seal member to cause compression deformation of the seal member.

2. The high pressure tank according to claim 1, wherein the communication unit is connected to a detecting unit configured to detect the fluid.

3. The high pressure tank according to claim 1, wherein the communication unit is connected to an external space to which the fluid is discharged.

* * * * *